Figure 1:
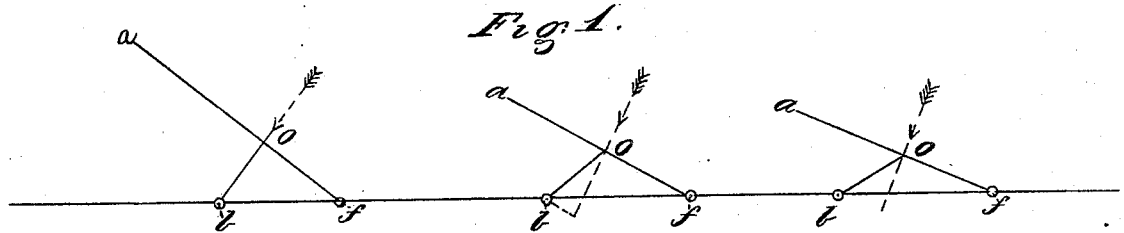

C. G. Gumpel. Sheet 1, 4 Sheets.
Steering App's.
N° 106,358. Patented Aug. 16, 1870.

Witnesses:
Chas. D. Abel,
Jno. Millard

Inventor:
C. G. Gumpel

C. G. Gumpel. Sheet 2, 4 Sheets.
Steering App's.
Nº 106,358. Patented Aug. 16, 1870.

Witnesses:
Chas D Abel
Jno Millard

Inventor
C G Gumpel

C. G. Gumpel.
Steering App's.
N° 106,358. Patented Aug. 16, 1870.

Witnesses:
Chas. D. Abel
Jno. Millard

Inventor
C. G. Gumpel

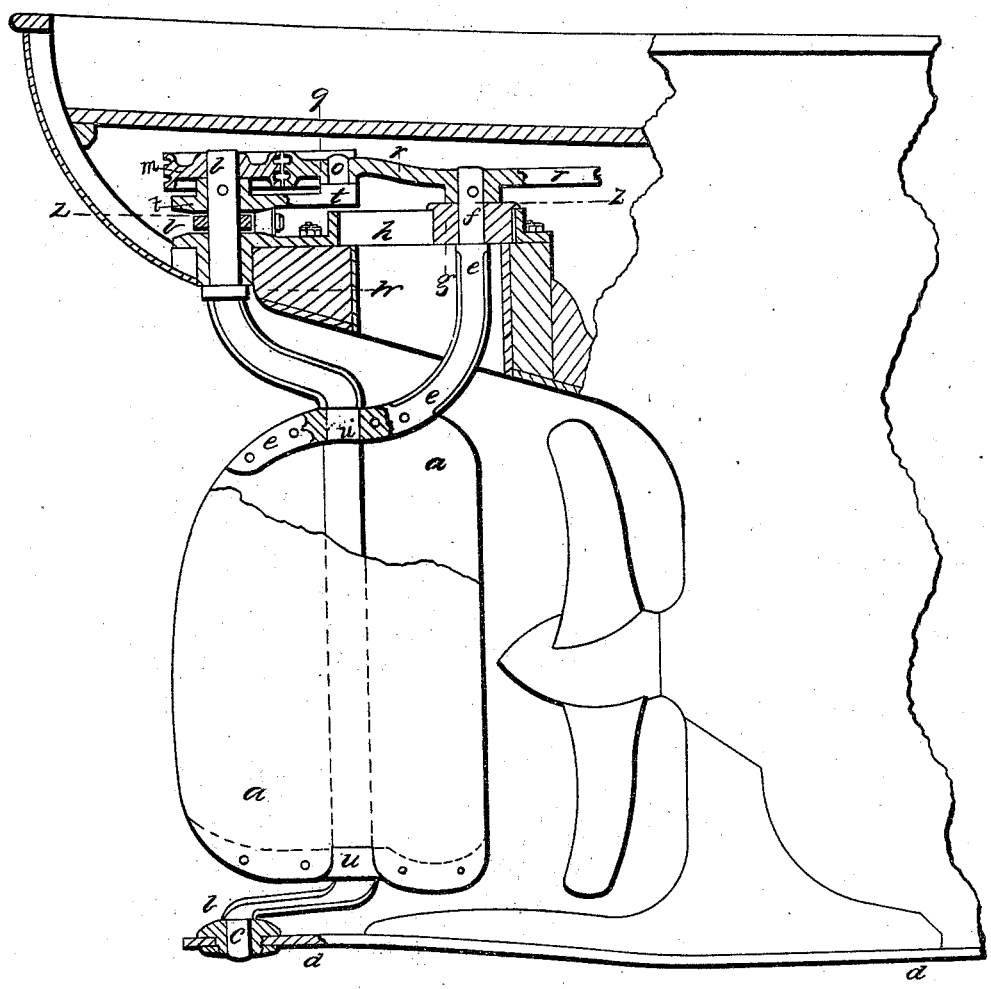

United States Patent Office.

CHARLES GODFREY GUMPEL, OF NO. 49, LEICESTER SQUARE, ENGLAND.

Letters Patent No. 106,358, dated August 16, 1870; patented in England November 2, 1869.

IMPROVEMENT IN STEERING APPARATUS.

The Schedule referred to in these Letters Patent and making part of the same

*To all whom it may concern:*

Be it known that I, CHARLES GODFREY GUMPEL, No. 49, Leicester Square, in the county of Middlesex, England, have invented an "Improved Construction of Ships' Rudders, and Steering-Gear therefor;" and do hereby declare that the following description, taken in connection with the accompanying drawing, hereinafter referred to, forms a full and exact specification of the same, wherein I have set forth the nature and principles of my said improvement, by which my invention may be distinguished from others of a similar class, together with such parts as I claim and desire to secure by Letters Patent; that is to say:

The amount of power required for deflecting ordinary rudders was the cause of the adoption of the so-called "balanced" or "differential" rudder, wherein the acting surface of the rudder was situated equally, or nearly so, on each side of the rudder-shaft. With such rudders, experience has, however, shown that, when the helm is put over to the utmost extent, the vessel refuses to answer the rudder readily, owing to the surface of the rudder-blade being thrown equally, or nearly so, on each side of the line of the keel, thus impeding the headway of the vessel, as well on the port as on the starboard side; now My invention consists in so constructing a ship's rudder, that, while the rudder-blade, when deflected, is thrown entirely to the one or the other side of the line of the keel, as in ordinary rudders, the power for so deflecting it is applied through a crank, or its equivalent, connected thereto at or near the middle of the surface of the blade, whereby the pressure of the water against the blade in one side of such point of attachment, will, to a certain extent, balance the pressure on the other side of such point.

For this purpose, the rudder-blade is carried at or near the middle of its surface by means of a crank or cranks, from a vertical shaft, supported, at its upper and lower ends, by the hindmost part of the vessel, which crank or cranks, when in the fore and aft position, points or point toward the forward part of the vessel, and upon which crank or cranks the rudder-blade is free to turn within the limits hereinafter described. On turning this crank rudder-shaft for the purpose of deflecting the rudder-blade, (that is, to bring the helm over to port or starboard,) the whole of the rudder-blade is carried to either side of the line of the keel, the forward edge thereof being, however, caused to remain in such line of the keel by means of a pin or pins, fixed to the said blade, sliding in a slot or slots, fixed to the vessel in the line of the keel, or, in place of pins sliding in slots, the forward edge of the rudder-blade may be kept in the line of the keel by being connected to any suitable known form of "parallel motion."

Having thus set forth the nature of my invention, I will now proceed more particularly to describe the manner of performing the same, for which purpose I shall refer to the accompanying drawing, showing some of the various arrangements by which my invention may be carried into effect.

Figure 1, Sheet I, shown diagrams of the action of the rudder.

Figure 2:
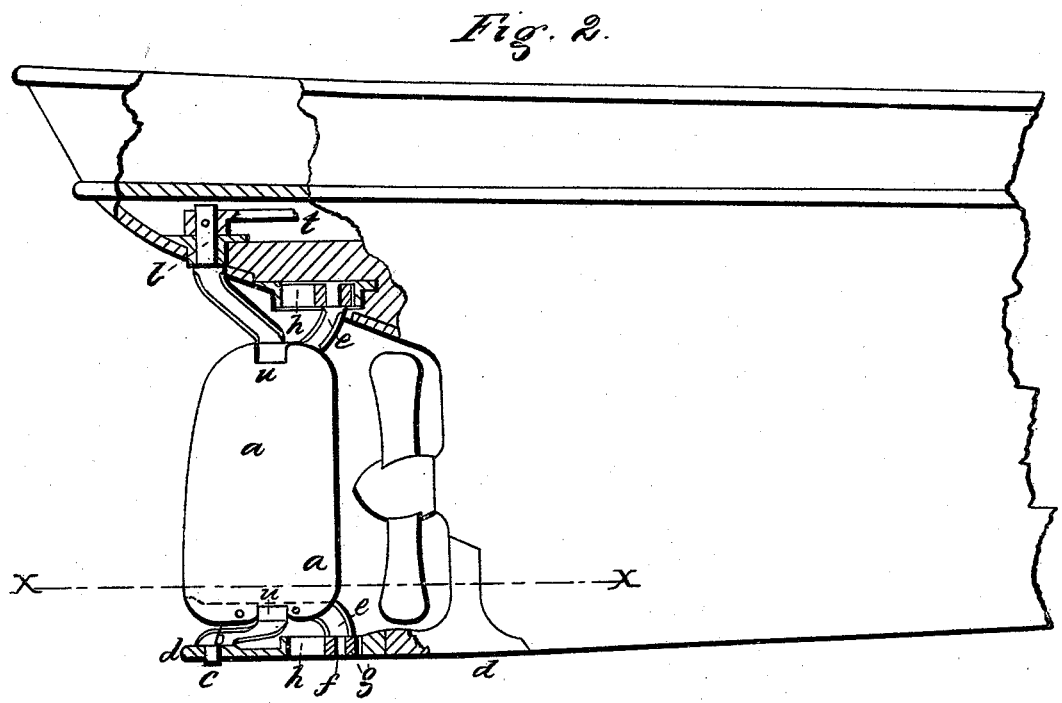
Figure 3:
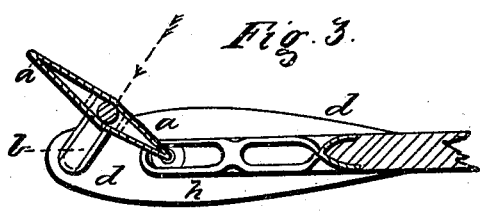
Figure 4:
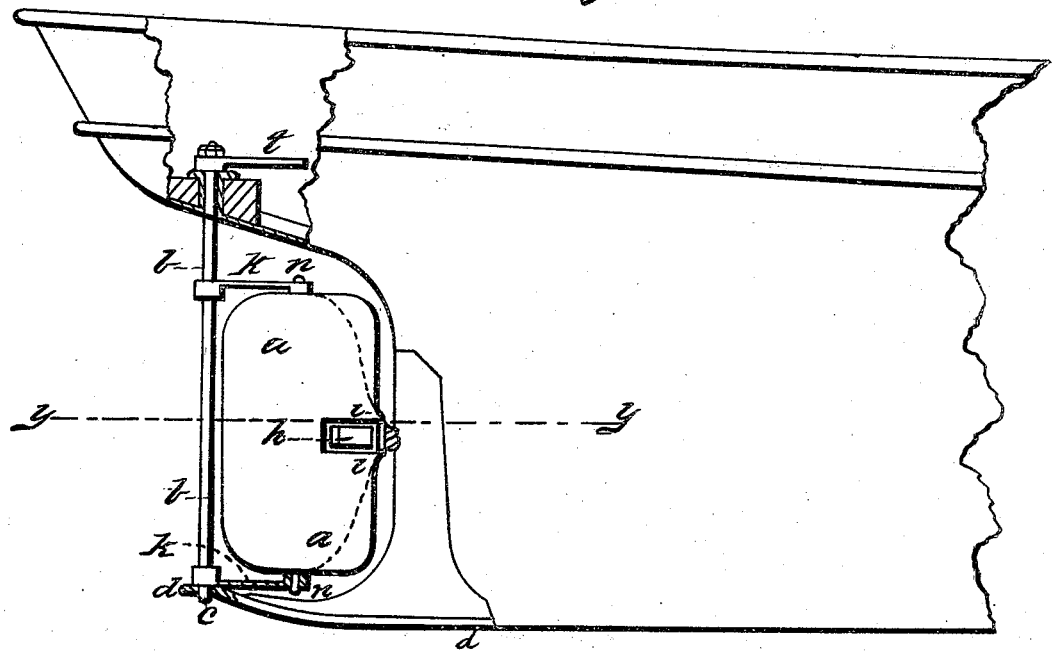
Figure 5:
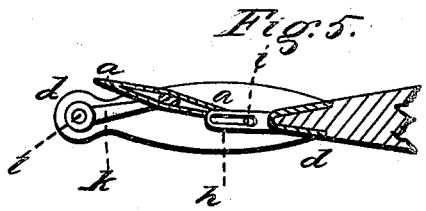
Figure 9:
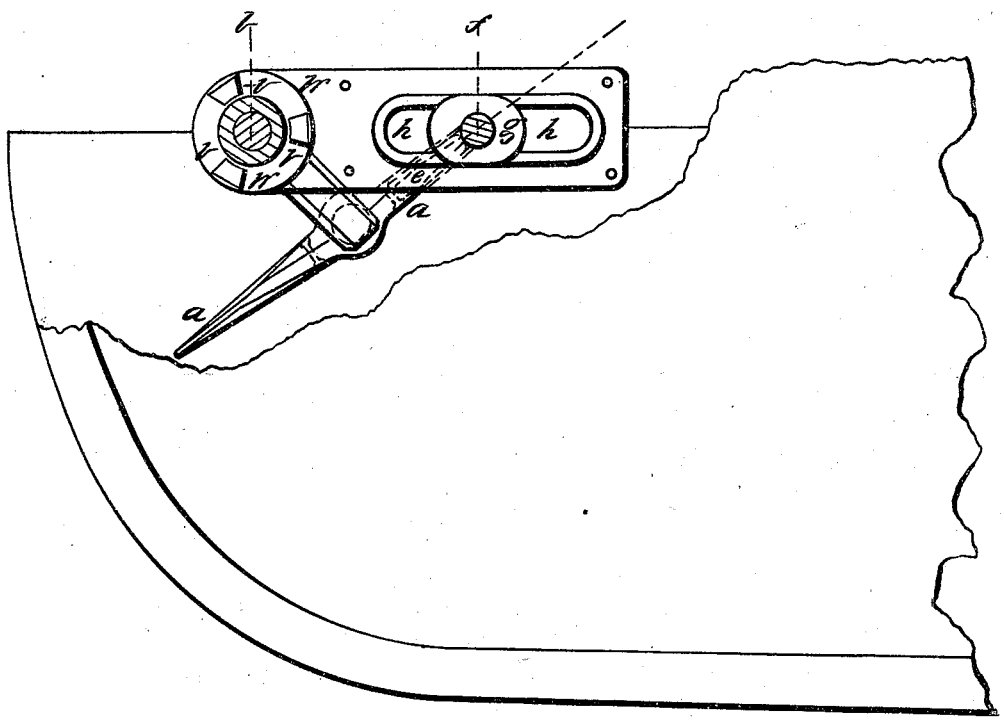

Figures 2 and 4, Sheet I, and Figure 8, Sheet II, show sectional elevations of three different arrangements of my improved rudder;

Figure 3, Sheet I, shows a sectional plan on line X X, fig. 2;

Figure 5, sheet I, shows a sectional plan on line Y Y, fig. 4;

Figure 9, Sheet II, shows a sectional plan on line Z Z, fig. 8; and

Figure 6:
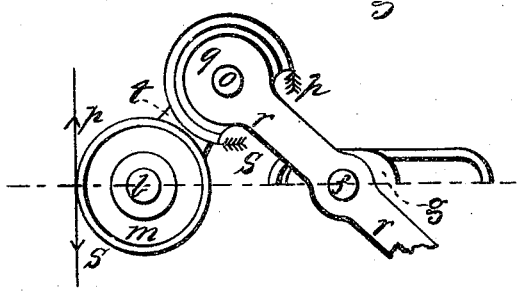
Figure 7:
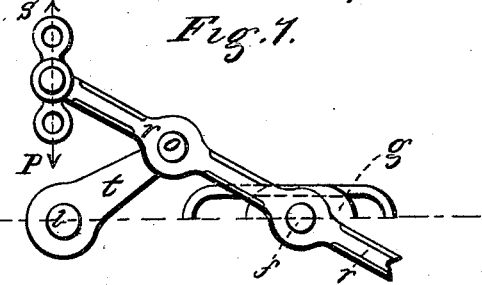

Figures 6 and 7, Sheet II, show arrangements of steering-gear.

In all the figures—

*a a* is the rudder-blade, which may be made of any suitable material or configuration.

This rudder-blade is divided, by its vertical axis, *u u*, figs. 2 and 8, and *n n*, fig. 4, into any suitable proportion of surface before and abaft the same.

This vertical axis may be formed either by means of a cranked rudder-shaft, as at *b u u b*, figs. 2 and 8, or by pins carried by cranks, arms, or levers, *k k*, fig. 4, fixed to a vertical shaft, *b b*, fig. 4.

Such cranked shaft or cranks, when the rudder is in midships, (that is, in a fore and aft position,) points or point toward the bow of the vessel, and, when the shaft is turned to either side, the crank or cranks, or arms carry the rudder-blade also over to the same side; thus, figs. 3 and 5 show, in plan, the crank-shaft and rudder deflected to the port side, and fig. 9 shows them deflected to the starboard side of the vessel.

While being so deflected, the fore edge of the rudder-blade is maintained in the line of the keel, or nearly so, either by means of one single arm, *e e*, fig. 8, fixed thereto, and working with a journal, *f*, (coinciding with the fore edge of the rudder, or nearly so,) in a slotted frame, *h*, fixed in the line of the keel, the journal being made to turn in the sliding block *g* in the slot, or the blade is provided with two such arms, one at the upper and one at the lower extremity, as shown at *e e*, fig. 2, also working in slots, *h h*, in the line of the keel; or, again, the fore edge of the rudder-blade may carry a pin at any one or more points in its vertical height, as at $i\ i$, fig. 4, working in slotted arms, $h$, in the line of the keel; or the maintaining and guiding the motion of the fore edge of the rudder-blade in the line of the keel might also be effected by connecting the arms, journals, or pins to any suitable known arrangement of parallel motion.

By these arrangements it will be seen that, as the rudder is carried over to the port or starboard side by the rudder-shaft, the fore edge thereof is made to remain in, or nearly in, and to slide to and fro in the line of the keel, and thus the rudder-blade will be deflected from that line to an extent determined, first, by the amount of rotation given to the rudder-shaft; secondly, by the proportion existing between the length of the crank or cranks or arms which carry the rudder-blade and the distance of the vertical axis on which the rudder rotates from the center of the pin or pivot, pins or pivots, which guide the fore part of the rudder; that is, referring to fig. 1, in which $b$ is the rudder-shaft, $o$ the crank-pin, and $f$ the sliding pin or pivot, the angle of the rudder with the line of the keel is determined by the proportion existing between the length $b\ o$ and the length $o\ f$.

From this figure, representing the rudder-blade $a\ f$ as being deflected to different angles, it will be seen that the pressure of the water at right angles to the rudder-surface will, in its direction, approach nearer to that of the crank of the rudder-shaft, until it arrives at a certain angle, when the pressure will be directly in a line with, and, consequently, borne by, the shaft, removing thereby all or nearly all strain from the steering-gear.

When the proportion of the crank-arm $b\ o$ is to the fore part of the rudder-blade $o\ f$, as 4 to 5, the rudder-blade will be at right angles to the crank or arms of the rudder-shaft when the rudder-blade is deflected to an angle of about thirty-eight and one-half degrees. This proportion, although by me considered the best, may be varied, as also may the fore edge of the rudder-blade be made not to correspond with the sliding pin or pins, or pivots, the latter being, if desired, made to extend further from the axis of the rudder-blade than the fore edge of such blade.

In case the rudder-blade is carried by cranks or arms, fixed to a vertical shaft, as shown in fig. 4, it may be advisable to reduce the fore part of the rudder-blade, as indicated by the dotted lines, whereby the after part can be made to overbalance the fore part of the rudder-blade to any desirable extent, which will give a greater tendency to the rudder to right itself; that is, to be forced into the position of the line of the keel by the water which presses upon the rudder-surface, either in consequence of the vessel moving ahead, or the screw-propeller driving a column of water astern.

When it is desirable to throw part of the strain, which results from the pressure of the water against the rudder, on the sliding pin or pivot $f$, fig. 1, the after part of the blade $a\ o$ can be reduced in surface, whereby the fore part $o\ f$ of the blade will overbalance it, and, part of the strain being taken by the pin or pivot $f$, there will be less strain on the rudder-shaft, which latter will hence require less power to be turned. Altogether, I do not limit myself to any proportion existing between the fore and after part of the blade.

Figs. 2, 3, 4, 5, and 8 show how, by means of a plate, $d\ d$, the lower part of the rudder-shaft may be held in position, the said plate $d\ d$ projecting abaft, and being provided with a suitable bearing, surrounding the end of a shaft at $c$.

The upper part of the shaft, where it enters the body of the vessel, may, in a similar manner, be held in a bearing, as shown in figs. 2 and 4, and may, besides, be supported on friction-rollers, as shown in figs. 8 and 9, where $v\ v\ v$ are the friction-rollers, resting on the surface of the bearing $w$.

Immediately above and resting on the friction-rollers is the arm or tiller $t$, which latter is firmly secured to the shaft, and serves, also, to support the weight of the rudder and the shaft by resting on the friction-rollers.

The turning of the rudder-shaft $b$ may be effected by simply fixing upon it the tiller $t$, as shown in figs. 2 and 4, which tiller can be actuated by any suitable known arrangement of wheel and ropes; or, the pin or pivot $f$ may be provided with an arm or lever, $r\ r$, figs. 6, 7, and 8, this latter arm or lever being firmly secured to the said pin or pivot, and extending toward the bow of the vessel to any suitable length, to be moved by the hand, like the tiller of any small vessel or boat.

Or, this last-named tiller, $r\ r$, fig. 7, may be extended abaft, and be provided, first, with a suitable hole or bearing, to embrace and work on a pin, $o$, figs. 6, 7, and 8, firmly secured to the tiller $t$, (or the pin $o$ may be fixed to $r\ r$, and work in a hole or bearing provided for it in the tiller $t$;) and, secondly, the tiller $r\ r$, being extended sufficiently abaft for that purpose, the said tiller $r\ r$ may have attached to its end, by any suitable means, the ropes or chains by means of which the steering-wheel may be made to pull the tiller $r$, and, with it, the tiller $t$, and also the rudder to either port or starboard, as indicated by the arrows $p$ and $s$, fig. 7.

Or, the end of the tiller $r$ may be formed into a circular segment, $q$, fig. 6, round the pivot $o$, as a center, the circumference of the said segment meeting the circumference of a pulley, $m$, figs. 6 and 8, which pulley fits loose on the projecting part of the rudder-shaft $b$, or it may be fitted loose on a boss of the tiller $t$, the said boss being carried up high enough on the shaft to extend through the pulley, there to bear against a nut or a cotter, screwed on or driven through the end of the shaft. (This latter arrangement is not shown on the drawing.)

Both the segment $q$, as also the pulley $m$, are provided with two grooves, as shown in section in fig. 8, so that the chains or ropes, coming from the steering-wheel, may be slung round the pulley and the segment, one end of the chain or rope in the upper, the other in the lower groove, both ends being fastened to the tiller $r$.

In fig. 6, the two arrows, $p\ p$ and $s\ s$, indicate the direction in which the ropes or chains have to be pulled for the purpose of bringing the helm to port or starboard; that is, the rudder to starboard or port. Or the chains or ropes may be fastened to the pulley $m$, instead of being carried to the steering-wheel. The latter may then be placed immediately above or in front of the shaft $b$, and made to act on the pulley $m$ by any known suitable mechanism or steering-gear, as at present frequently applied to the shaft of the ordinary rudder.

Having thus described the nature of my invention, and in what manner the same is to be performed, I wish it to be understood that I do not limit myself to the arrangement of devices for shifting the rudder-blade, shown on the accompanying drawing, as these may be variously modified without departing from the nature of my invention; but

What I claim is—

1. A rudder-blade, hung at points intermediate between its forward and rear edges by means of a crank-shaft or crank-arms, whereby the rudder-blade, when deflected, is thrown entirely to the one or other side of the keel, substantially as described.

2. The rudder-blade, hung as set forth in preceding claim, connected, at or near its forward edge, either directly or by an interposed arm, with a guiding-slot, guide, or other equivalent parallel motion, whereby the forward edge of the rudder-blade shall be held in or near the line of the keel, substantially as described.

3. The tiller-arm $r$, connecting the tiller $t$ of the crank-axle $b$ with the journal $f$ of the guiding-arm $e$, combined substantially as described.

4. The rudder-blade $a$, hung in the crank-arms $k$, in combination with pin $i$ and slot $h$, substantially as illustrated in figs. 4 and 5.

In testimony I have signed my name to this specification in the presence of two subscribing witnesses this 25th day of April, 1870.

CHARLES GODFREY GUMPEL.

Witnesses:
CHAS. D. ABEL,
JNO. MILLARD.